United States Patent [19]

Haas, Sr. et al.

[11] Patent Number: 5,048,403
[45] Date of Patent: Sep. 17, 1991

[54] OVEN FOR ROASTING PIECES OF BAKED WARE

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 478,261

[22] Filed: Feb. 12, 1990

[30] Foreign Application Priority Data

Feb. 20, 1989 [AT] Austria .................. 379/89

[51] Int. Cl.⁵ .......................................... A47J 37/00
[52] U.S. Cl. ...................................... 99/355; 99/373; 99/380; 99/386; 99/427; 99/443 C; 99/472; 126/21 R; 126/41 C
[58] Field of Search ................. 99/352, 355, 386, 387, 99/373, 427, 443 C, 472, 450.7, 450.1, 380; 425/126 R, 229, 231; 426/306; 126/21 A, 21 R, 41 R, 41 C

[56] References Cited

U.S. PATENT DOCUMENTS

| | | | |
|---|---|---|---|
| 1,584,825 | 5/1926 | Tugendhat | 99/373 |
| 3,295,434 | 1/1967 | Wilhelm et al. | 99/443 C |
| 3,935,807 | 2/1976 | Main et al. | 99/352 |
| 4,308,790 | 1/1982 | Haas, Sr. et al. | 99/380 |
| 4,348,166 | 9/1982 | Fowler | 99/427 |
| 4,503,759 | 3/1985 | Haas, Sr. et al. | 99/380 |
| 4,710,117 | 12/1987 | Haas, Sr. et al. | 425/126 R |

FOREIGN PATENT DOCUMENTS 2204227  11/1988  United Kingdom .................. 99/373

Primary Examiner—Timothy F. Simone
Attorney, Agent, or Firm—Collard, Roe & Galgano

[57] ABSTRACT

A baking or roasting oven is provided with a transfer apparatus by which the pieces of edible material which is to be roasted, such as slices of white bread, soft wafers, etc., are fed into the oven and the roasted toasts are removed from the oven. The oven comprises an endless chain of hinged tongs, which can be opened and closed and are adapted to hold the pieces of edible material which are to be roasted. The chain of tongs moves in the oven in two superimposed planes. A transfer station is provided adjacent to the upper plane in which the upper course of the chain of tongs extends. The tongs move in an open position through that transfer station, which contains two sets of drums, which are closely spaced one behind the other in the direction of travel of the upper course of the chain of tongs and are disposed above the bottom plates of the open tongs of said upper course. The drums of the set consist of vacuum drums, which rotate at a surface speed that is equal to the speed of travel of the chain of tongs. The pieces of edible material which are to be roasted or which have been roasted are held on the shells of said drums as said pieces are transported by said drums.

10 Claims, 6 Drawing Sheets

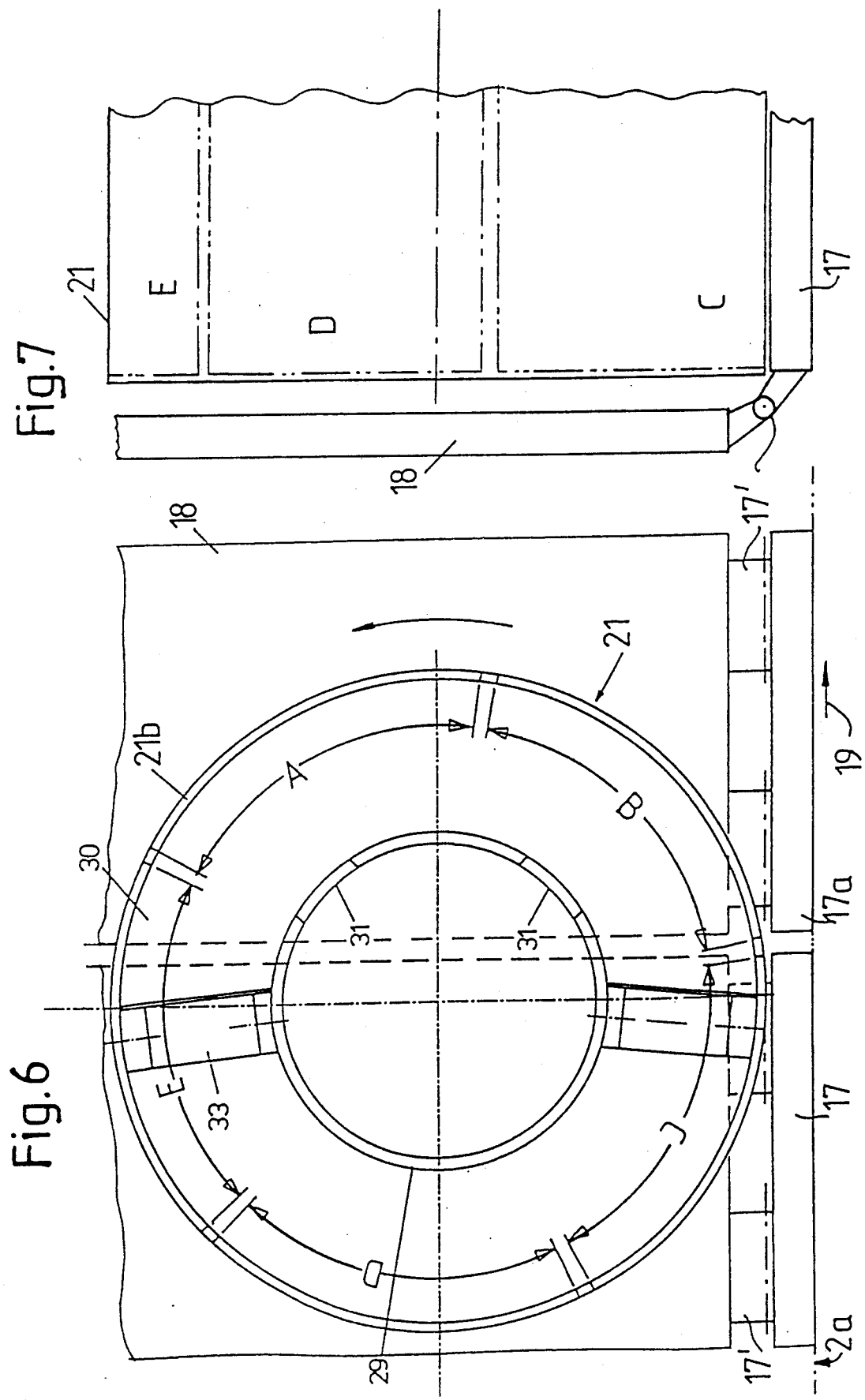

OVEN FOR ROASTING PIECES OF BAKED WARE

FIELD OF THE INVENTION

This invention relates to machines for an industrial production of baked products. More specifically the invention relates to a novel transfer apparatus, which is associated with a baking or roasting oven and by which pieces of edible material which are to be roasted, such as slices of white bread, soft wafers or the like, are fed into the baking or roasting oven and the roasted slices of toast are removed from the oven.

DESCRIPTION OF THE PRIOR ART

In the industrial production of so-called Melba toasts, slices of white bread or of toast are roasted to make thin slices of toast, which are crisp through and through. Just as the wafer baking ovens known from the wafer-making industry, such baking or roasting ovens comprise an endless chain of hinged tongs, which can be opened and closed, and said chain extends in two superimposed planes. Each tongs comprises two flat plates, which in the upper course of the chain constitute a top plate and a bottom plate, respectively, and holds the slices of white bread or toast between said plates as the tongs revolve through the heated oven in the production of Melba toasts. In their structural and mechanical design such ovens are similar to wafer baking ovens which are used to make crisp rectangular wafer sheets in the wafer making industry. From such wafer baking ovens the ovens for making Melba toast differ substantially only in that the top and bottom plates of the tongs are not provided with engraved portions for forming a wafer pattern and do not carry bars permitting vapor to escape and that the operations in which dough is poured and wafer sheets are removed from the wafer baking oven are omitted.

In a known Melba toast oven the slices of white bread or toast which are to be baked or roasted are placed onto the upper side of the bottom plates of the opened tongs in the upper course of the chain of tongs by hand via transportable chutes or reciprocable rakes or the like and the roasted toasts are permitted to fall out of opened tongs of the lower course of the chain of tongs.

SUMMARY OF THE INVENTION

It is an object of the invention to provide a novel transfer apparatus which permits a fully automatic, orderly placing of the pieces to be roasted, such as slices of bread or other baked ware, wafers etc. and a fully automatic orderly taking of the roasted pieces consisting of slices of toast.

Another object of the invention is to provide a novel transfer apparatus which permits the pieces to be placed and taken at locations which are closely spaced apart even if the pieces are to be moved over a relatively large height as they are placed and taken.

The present invention proposes an apparatus for transferring pieces of edible material in association with an oven for roasting such pieces, such as slices of white bread for making toasts or soft wafers or the like. Such oven comprises an endless chain of tongs, which chain extends in the oven in two superimposed planes. The oven comprises a transfer station, which is disposed adjacent to the upper one of the planes in which the chain of tongs extends and in which pieces of material to be roasted are introduced into the tongs of the chain of tongs and pieces of roasted material are removed from the tongs of the chain of tongs. The chain of tongs comprises hinged tongs, which can be opened and closed and for the heat treatment of the pieces of material each tongs comprises two plates, which in the upper course of the chain constitute a top plate and a bottom plate, respectively. The tongs move in an open position through the transfer station of the oven and move in a closed position with at least one piece of material between the two plates in the remaining oven. The transfer apparatus in accordance with the invention comprises two sets of rotating vacuum drums, which are disposed in the transfer station of the oven. Said sets of drums are arranged one closely behind the other in the direction of travel of the upper course of the chain of tongs and are disposed above the bottom plate of the open tongs of said upper course. The pieces of material which are to be roasted and the pieces of roasted material are held on the shells of the vacuum drums of respective sets of drums as said pieces are transported to and away from the chain of tongs. The vacuum drums of the two sets of drums rotate at a surface speed which corresponds to the speed of travel of the chain of tongs in the oven. The lowermost suction drum of each set thereof is disposed closely above the top surface of the bottom plate of the open tongs of the upper course of the chain of tongs in such a sense that the lower portion of the periphery of such lower most drum moves in the direction of travel of the upper course of the chain of tongs.

In accordance with the invention the locations at which the pieces of edible material are placed on and taken from the tongs may be closely spaced apart so that the length of the space which is required in the oven for the transfer station, i.e., for a combined feeding and taking station, and which is required to be traversed by the tongs in an open position, may be relatively small. In ovens in which pieces of edible material are handled at a varying rate, i.e., which operate at a varying production rate, the plates of the tongs may have the same length in the direction of travel of the chain of tongs and the handling and production rate may be varied in that the width of the tongs plates, measured transversely to the direction of travel, is different in different ovens. In such ovens it is possible in accordance with the invention to arrange the locations at which the pieces of edible material are placed on and taken from the tongs at a distance from each other which is approximately the same in all ovens. In that case the heights which must be traversed by the pieces of edible material in the transfer station will be different in different ovens and this may be provided for by the selection of the number of drums in each set of drums, i.e., only by the selection of the overall height of the apparatus. Particularly because the pieces of edible material are fully automatically taken by the transfer apparatus, such pieces may be delivered directly from the roasting oven to the machine for packaging the pieces of edible material, such as Mebla toast, because the pieces of edible material will be in an orderly arrangement and in a predetermined position as they are received by the packaging machine.

In accordance with a further feature of the invention, one set of drums may comprise an odd number of vacuum drums and the other set of drums may comprise drums in a number which is larger by one than said odd number. Such a design will permit the pieces of edible material to be received and delivered by the transfer apparatus in accordance with the invention on the same side of said apparatus.

In accordance with a further feature of the invention, each set of drums comprises parallel superimposed vacuum drums, adjacent ones of said vacuum drums rotate in mutually opposite senses and their shells are spaced apart a distance which is equal to the thickness of the pieces of edible material. The distance between adjacent drums in the two sets of drums may be equal to different thicknesses of the pieces of edible material. In a roasting oven for making Melba toasts the distance between the drums is smaller on the delivering side of the transfer apparatus than on the placing side because the roasted Melba toasts have a small thickness whereas the distance between the drums on the placing side corresponds to the thickness of the thicker slices of white bread which are to be roasted.

In accordance with a further feature of the invention all vacuum drums of a set of drums are connected to a common vacuum source and said vacuum source is operatively connected to the shell of each drum only in that part of the circumference of said shell which serves to transport the pieces of edible material. As a result, it will be sufficient to apply a low vacuum and to suck air at a low rate through the vacuum drum.

Also within the scope of the invention the shells of the suction drums may be perforrated and the pattern of the perforations of each shell may correspond to the pattern in which the pieces of edible material are arranged on the bottom plates of adjacent tongs of the chain of tongs. That design will permit a continuous transport of the pieces of edible material even at a high speed so that the apparatus in accordance with the invention can be used with ovens at a high rate and the chain of tongs travels at high speed.

In accordance with a further feature of the invention the circumference of each vacuum drum equals an integral multiple of the distance, measured in the direction of travel of the chain of tongs, between the two leading edges of the bottom plates of two consetive tongs of the upper course of the chain of tongs. Particularly if the vacuum drums and the chain of tongs revolve in perfect synchronism with each other, that design will ensure that closely adjoining pieces of edible material will be placed on and taken from the bottom plates in exact register therewith and that the top and bottom surfaces of all pieces of edible material which lie between the two plates of a tongs will be in full surface contact with both of said plates and said pieces of edible material will not overlap each other.

BRIEF DESCRIPTION OF THE DRAWING

FIG. 6 shows an enlarged view of a detail of FIG. 3, the perforations in the shell of the lowest vacuum drum above the bottom plate of the swung-open tongs being arranged in a pattern of schematically indicated zones corresponding to the pattern in which the pieces of edible material are arranged on the bottom plates.

FIG. 7 is a fragmentary side view of FIG. 6.

DETAILED DESCRIPTION OF THE PREFERRED EMBODIMENT

Figure 1:
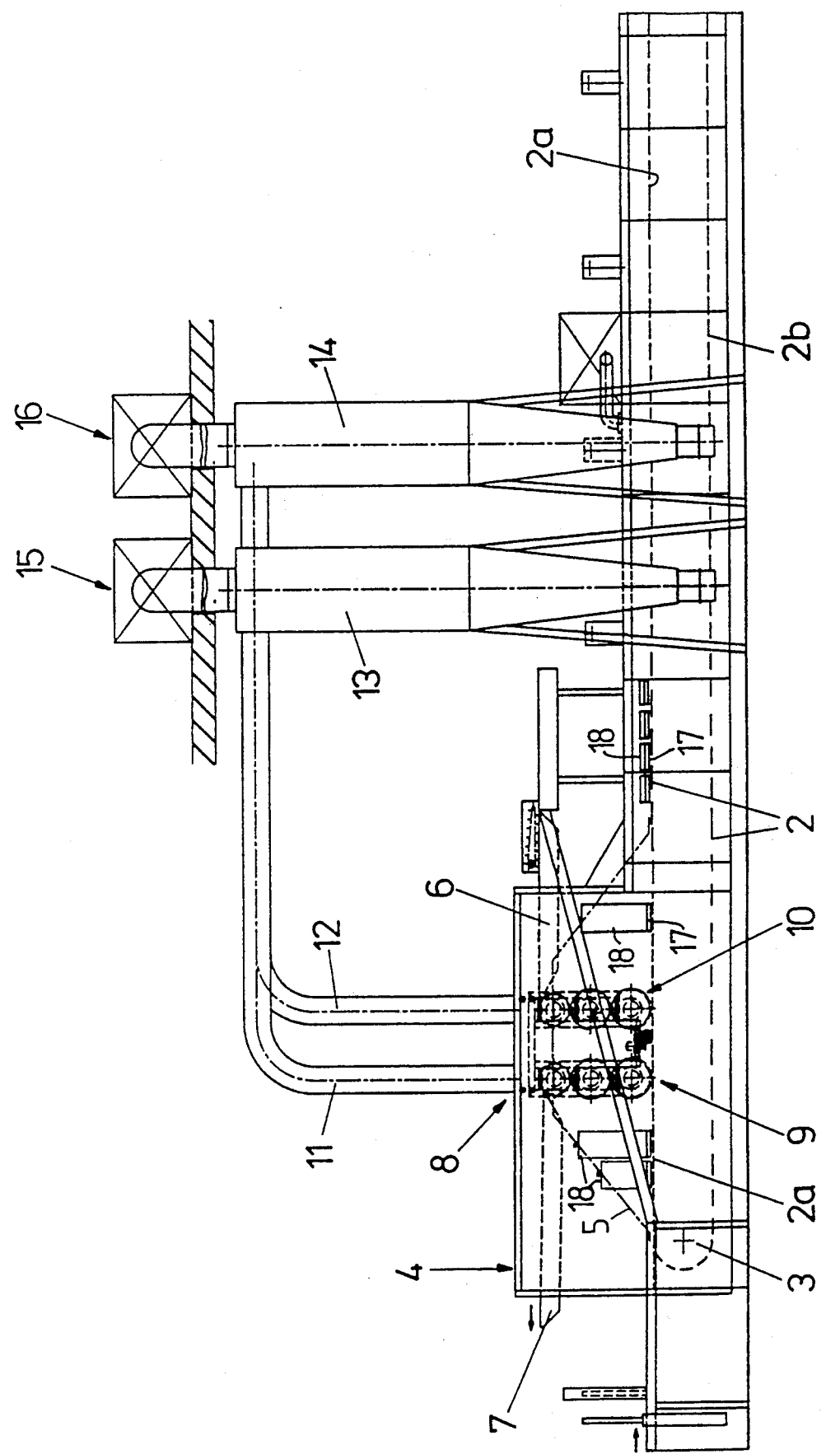
FIG. 1 is a side elevation showing an an oven which embodies the invention and comprises a revolving chain of tongs.
Figure 2:
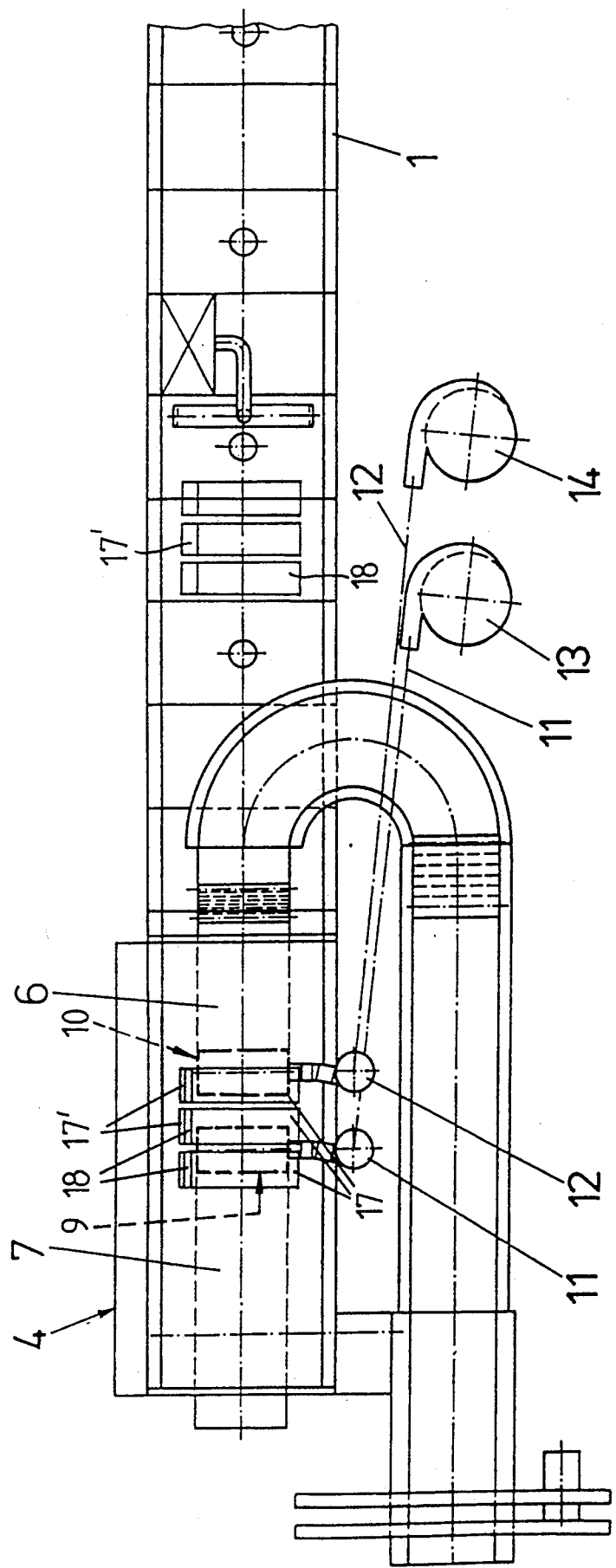
FIG. 2 is a top plan view showing the oven of FIG. 1.

An illustrative embodiment of an oven which serves to make pieces of Melba toast from slices of white bread or toast and in accordance with the invention is provided with a transfer apparatus will now be described more in detail with reference to the drawing.

The oven 1 has the basic design of a wafer baking oven which is known in the wafer-making industry and is used there to make rectangular wafer sheets and comprises revolving hinged baking tongs, which can be swung open and shut. But the present oven 1 does not comprise means for pouring dough and for removing wafer sheets.

The oven 1 comprises an elongate, parallelepipedic heat-insulating housing, which in its interior contains an endless chain 2 of consecutive tongs, which revolve in a heated space for roasting slices of white bread, which are enclosed in each tongs between two plates thereof, which constitute a top plate 18 and a bottom plate 17 in the upper course 2a of the chain 2. The top and bottom plates of each tongs are connected by a hinge 171 and can be swung open and shut. The upper course 2a and the lower course 2b of the endless chain 2 of tongs travel in respective superimposed planes, which are substantially horizontal. A receiving and taking station or transfer station 4 is provided in front of and adjacent to the merely symbolically indicated forward reversing wheel 3, around which the chain 2 of tongs is trained. As is indicated by a track 5 for the guide rollers of the top plate of each tongs, each tong which moves through the transfer station 4 is swung open through about 90° and each tong moves in an open position over a certain distance in the transfer station 4 and is subsequently closed.

The slices of white bread which are to be roasted in the oven 1 are fed into the receiving and delivering station 4 by a feed belt 6 in a substantially horizontal feeding plane, which extends above the top ends of the vertical top plate which has been swung open in the upper course of the chain of tongs. The roasted pieces of toast are moved out of the receiving and delivering station by a delivering belt 7 also in a plane extending above the top ends of the vertical top plate which has been swung open in the upper course of the chain of tongs. In accordance with the invention a placing and removing apparatus or transfer apparatus 8 is provided in the receiving and delivering station 4 and comprises two sets 9, 10 of vacuum drums, which communicate via vacuum lines 11, 12 and cyclone filters 13, 14 with respective vacuum sources 15, 16. The two sets 9, 10 of drums are parallel to each other and their superimposed vacuum drums bridge the vertical distance between the top surface of the bottom plates 17 of the upper course of the chain of tongs and the planes in which the pieces of edible material are received and delivered, respectively.

Figure 3:
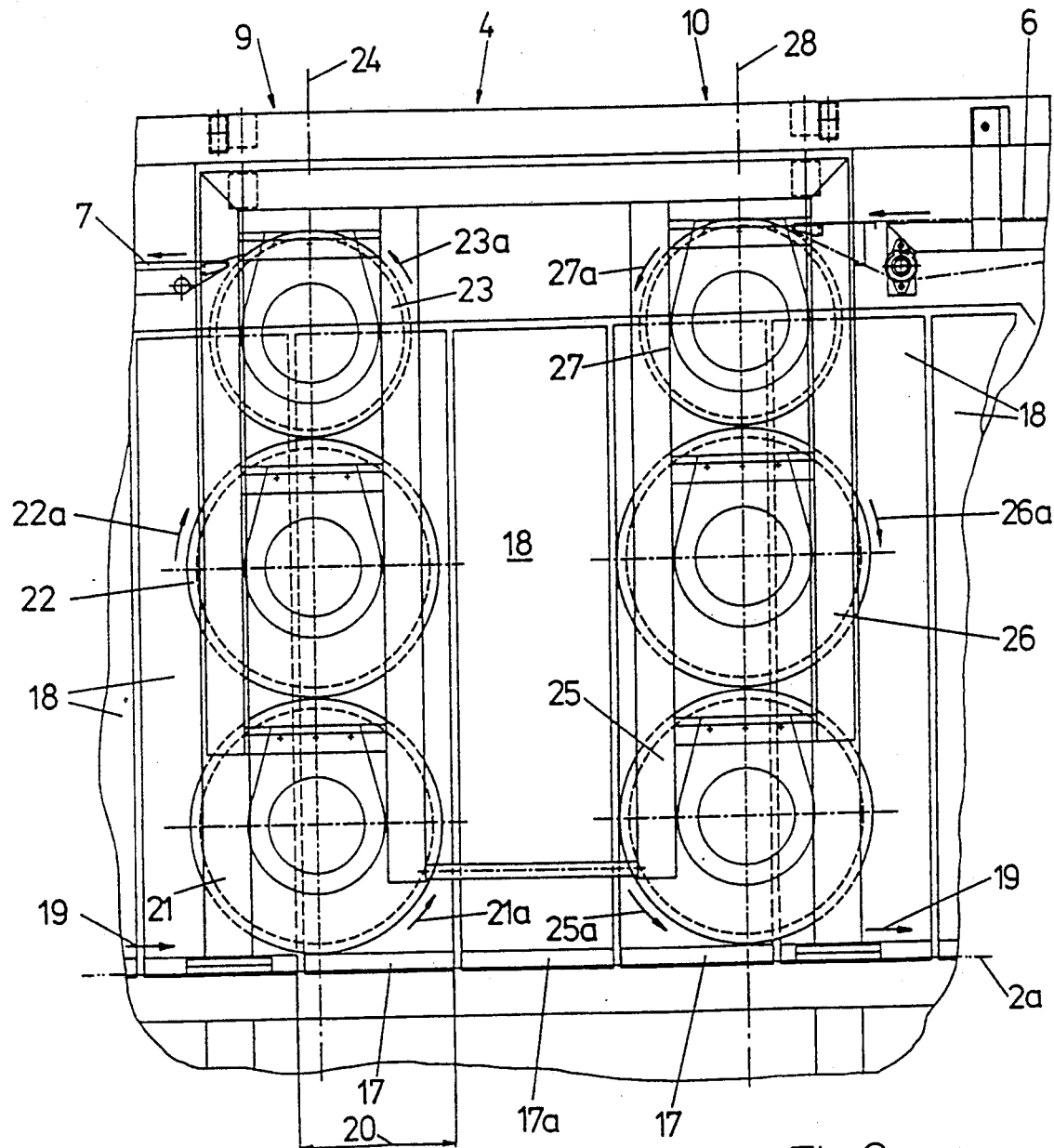
FIG. 3 is an enlarged view showing the receiving and delivering station of the oven of FIGS. 1 and 2.

As is apparent from FIG. 3 the transfer apparatus 8 which is provided in accordance with the invention is arranged in that portion of the transfer station 4 in which the tongs are swung open through about 90°. The bottom plate 17 of each tongs extends in an approximately horizontal plane as it moves through the transfer station 4. The top plate 18 of each tongs extends in an approximately vertical plane as it moves through the transfer station 4. The direction of travel of the tongs in the transfer station 4 is indicated by arrows 19 in FIG. 3, in which the bottom plates 17 and top plates 18 of the tongs are only disgrammatically indicated. The tongs are identical and in the direction of travel (arrow 1) of the upper course of the chain. FIG. 3 indicates the distance 20 between the leading edges of the two bottom plates 17, 17a, which distance equals the sum of the length of a bottom plate 17, measured in the direction of travel 19 of the upper course of the chain, and the distance between two adjacent bottom plates 17, 17a.

The set of drums 9 which precedes in the direction of travel 19 of the upper course of the chain consists of superimposed vacuum drums 21, 22, 23, which have parallel axes and rotate in senses 21a, 22a, 23a, respectively. In the embodiment shown the axes of rotation of said vacuum drums 21, 22, 23 lie in a common plane 24 which is at right angles to the direction of travel 19 and to the plane of the bottom plates 17, of the upper course of the chain.

The set of drums 10 which is the second in the direction of travel 19 consists also of three superimposed vacuum drums 25, 26, 27, which rotate in senses 25a, 26a, 27a, respectively. In the embodiment shown by way of examples the axes of rotation of the vacuum drums 25, 26 and 27 lie also in a common plane 28, which is parallel to the plane 24.

In FIG. 3 the vacuum drums 21 to 23 and 25 to 27 of the two sets of drums 9 and 10 are shown to have shells contacting each other for the sake of clearness because the distance between shells of adjacent ones of the drums 21 to 23 corresponds to the thickness of the slices of white bread and the distance between the shells of adjacent ones of the drums 25 to 27 corresponds to the thickness of the slices of toast. Said distances are very small in relation to the diameter of the vacuum drums.

Figure 4:
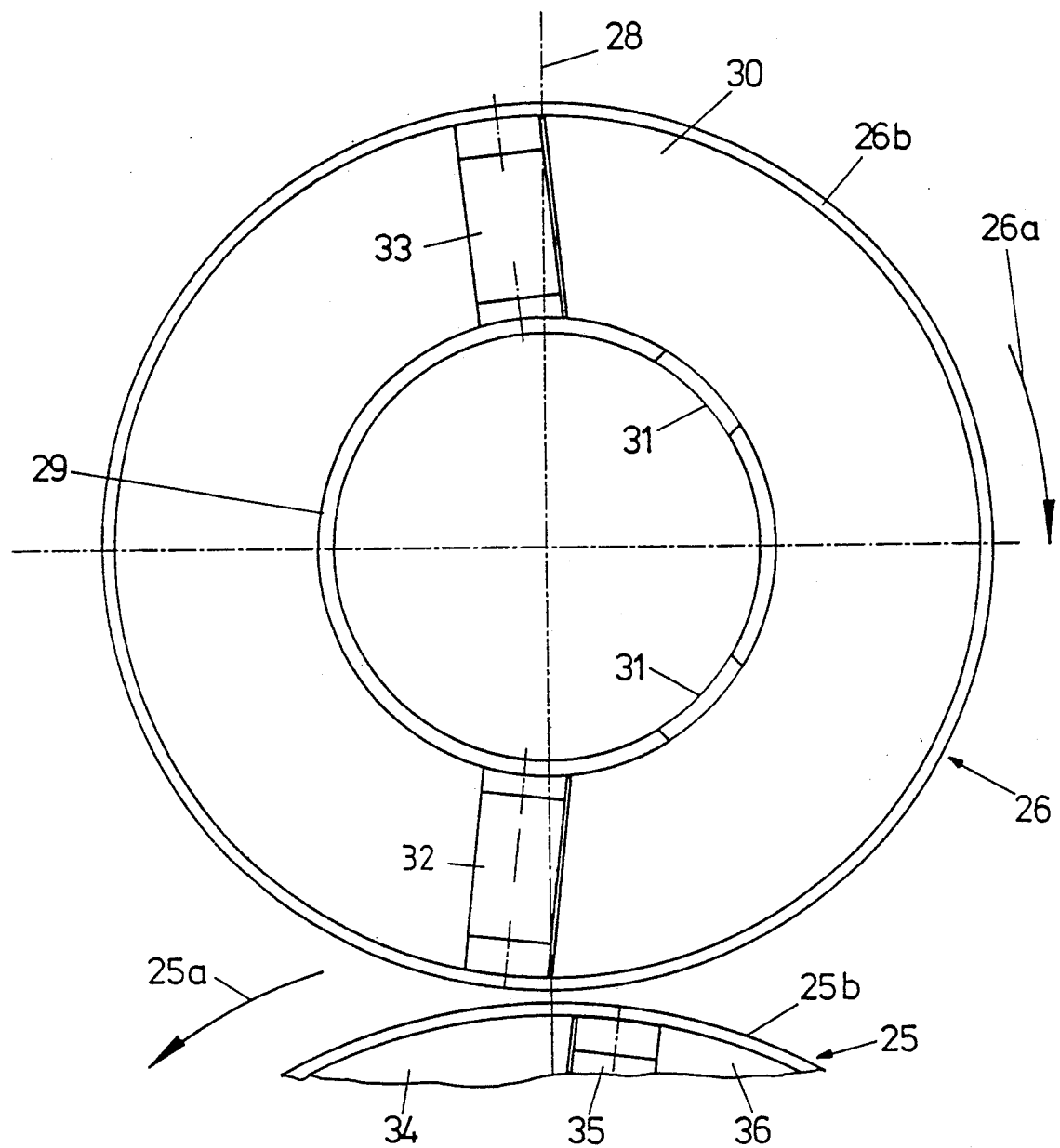
FIG. 4 is a transverse sectional view showing two adjacent vacuum drums of the transfer apparatus provided in accordance with the invention.

FIG. 4 is a sectional view showing the two superimposed vacuum drums 25 and 26, the shells 25b, 26b of which are spaced a distance apart which corresponds to the thickness of the slices of white bread. As is apparent from FIG. 4, the vacuum drum 26 comprises a stationary central vacuum tube 29, which has radial vacuum openings 31, which are open toward the suction side 30 of the drum 26, and also comprises a stationary partition, which is secured to the vacuum tube 29 and consists of two partition walls 32, 33, which at their radially outer ends have edges in sliding contact with the inside surface of the rotating shell 26b of the drum. That shell is formed with perforations, not shown. In the vacuum drum 25 the suction side 34 is also separated from the opposite side by a stationary partition wall 35.

Figure 5:
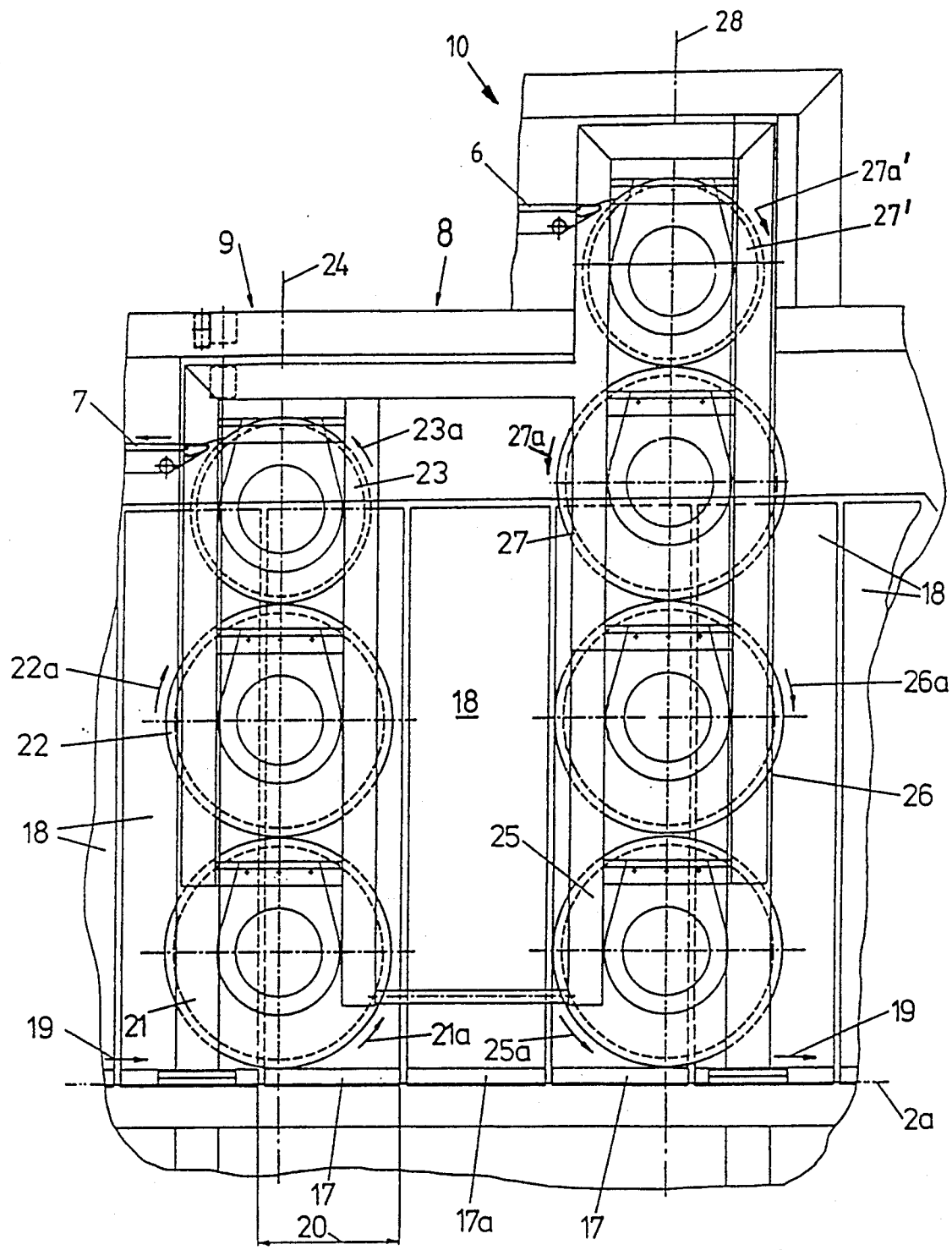
FIG. 5 is an enlarged view showing the receiving and delivering station of the oven similar to FIG. 3 but with three vacuum drums in one set and four vacuum drums in the other set.

In the modified transfer apparatus 8 shown in FIG. 5, set 9 of the vacuum drums comprises an odd number of vacuum drums 21, 22, 23 rotating in senses 21a, 22a, 23a while the second set 10 of vacuum drums comprises a number of superimposed vacuum drums 25, 26, 27, 27' which is larger by one than the number of vacuum drums of set 9, the latter vacuum drums rotating in senses 25a, 26a, 27a, 27a'. The arrangement is otherwise identical with that of FIG. 3, except that the pieces of edible material are received by feed belt 6 and are delivered by delivering belt 7 on the same side of transfer apparatus 8.

As shown in FIGS. 6 and 7, the shells of the vacuum drums may be perforated in a pattern corresponding to the pattern in which the pieces of edible material are arranged on bottom plates 17 of adjacent tongs of the chain of tongs, perforations 31 being provided in adjacent zones A, B, C, D, E of shell 21b of vacuum drum 21 corresponding to zones of bottom plate 17.

In the preferred embodiment shown in the drawing the planes in which the two courses 2a, 2b of the chain 2 of tongs travel, just as the feeding plane defined by the feeding belt 6 and the delivering plane defined by the delivering belt 7, are horizontal and parallel to each other. It will be understood that it is possible within the scope of the invention to arrange one or more of said planes with an inclination from the horizontal. In another modification within the scope of the present invention the axes of rotation of the drums of one set thereof may not be superimposed in a common plane but may be arranged, e.g., in a zigzag pattern so that the oveall height of the set of drums will be smaller than the sum of its drum diameter. That arrangement of the axes of rotation of the drums in a zigzag pattern will facilitate the adaptation of the overall height of the transfer apparatus provided in accordance with the invention to the design of the roasting oven if drums are employed which are equal in diameter. This will be of advantage, e.g., if the circumference of each vacuum drum equals an integral multiple of the distance between the two leading edges of two adjacent bottom plates and if the sum of the diameters of the drums of each set exceeds the vertical distance which must be bridged by the set of drums between the feeding plane and the top surface of the bottom plates of the upper course of the claim.

We claim:

1. An oven for roasting pieces of edible material, comprising
    an endless chain of tongs, which revolves in the oven and comprises an upper course and a lower course extending in upper and lower superimposed planes, respectively,
    a transfer station disposed adjacent to the upper plane and in which pieces of edible material which is to be roasted are placed into the tongs of the chain of tongs and pieces of roasted edible material are removed from said tongs, wherein
    said chain of tongs comprises hinged tongs adapted to be swung open and shut, and each of which comprises two plates which, in said upper course, constitute a top plate and a bottom plate and serve to heat-treat the pieces of edible material and move in said upper course in an open position through the transfer station and move in a closed position through the remainder of the oven with pieces of edible material held between said plates, and
    a transfer apparatus is provided in said transfer station and comprises two sets of rotating vacuum drums, which sets are closely spaced apart and arranged one behind the other in the direction of travel of said upper course and are disposed above the bottom plates of the open tongs in said transfer station and have shells and are adapted to hold the pieces of edible material which is to be roasted and the pieces of roasted edible material on said shells and to transport said pieces of material held on said shells, wherein
    the vacuum drums of the two sets of drums rotate at a surface speed which equals the speed of travel of the chain of tongs in the oven, each of said sets of drums comprises a lowermost vacuum drum having a lower shell portion adjacent to the upper plane, and each of said lowermost vacuum drums rotates in such a sense that said lower shell portion moves in the same direction as said upper course of said chain of tongs.

2. An oven as set forth in claim 1, wherein one of said set of drums comprises an odd number of vacuum drums and the other of said set of drums comprises vacuum drums in a number which exceed said odd number by one.

3. An oven as set forth in claim 1, wherein the drums of each of said sets are parallel and superimposed, adjacent vacuum drums of each of said sets rotate in mutually opposite senses and said shells of adjacent drums of each of said sets are spaced a distance apart which is equal to the thickness of said pieces of edible material.

4. An oven as set forth in claim 1, wherein all vacuum drums of each of said sets of drums communicate with a common vacuum source, the shell of each of said drums has in a part of its circumference a portion which serves to hold the pieces of edible material and only said portion of the shell of each of said vacuum drums communicates with said vacuum source.

5. An oven as set forth in claim 1, wherein said shells of said vacuum drums are formed with perforations arranged in a pattern which corresponds to a pattern of pieces of edible material on the bottom plates of adjacent tongs of the chain of tongs.

6. An oven as set forth in claim 5, wherein each of said vacuum drums has a circumference that is equal to an integral multiple of the distance, measured in the direction of travel of the chain of tongs, between the two leading edges of the bottom plates of two adjacent tongs of the chain of tongs.

7. An oven as set forth in claim 1, wherein a common drive is provided for said chain of tongs and said vacuum drums.

8. A transfer apparatus for use in an oven for roasting pieces of edible material, which oven comprises an endless chain of tongs, which revolves in the oven and comprises an upper course and a lower course extending in upper and lower superimposed planes, respectively, a transfer station disposed adjacent to the upper plane and in which pieces of edible material which is to be roasted are placed into the tongs of the chain of tongs and pieces of roasted edible material are removed from said tongs, wherein said chain of tongs comprises hinged tongs adapted to be swung open and shut, and each of which comprises two plates which, in said upper course, constitute a top plate and a bottom plate and serve to heat-treat the pieces of edible material and move in said upper course in an open position through the transfer station and move in a closed position through the remainder of the oven with pieces of edible material held between said plates, which transfer apparatus is adapted to be provided in said transfer station and comprises two sets of rotating vacuum drums, which sets are closely spaced apart and adapted to be arranged one behind the other in the direction of travel of said upper course and are adapted to be disposed above the bottom plates of the open tongs in said transfer station and have shells and are adapted to hold the pieces of edible material which is to be roasted and the pieces of roasted edible material on said shells and to transport said pieces of material held on said shells, wherein the vacuum drums of the two sets of drums are operable to rotate at a surface speed which equals the speed of travel of the chain of tongs in the oven and each lowermost vacuum drum of the two sets of drums is operable to rotate in a sense that the respective lower shell portion adjacent the upper plane moves in the same direction as said upper course of said chain of tongs.

9. A transfer apparatus as set forth in claim 8, wherein one of said set of drums comprises an odd number of vacuum drums and the other of said set of drums comprises vacuum drums in a number which exceed said odd number by one.

10. A transfer apparatus as set forth in claim 8, wherein all vacuum drums of each of said sets of drums communicate with a common vacuum source, the shell of each of said drums has in a part of its circumference a portion which serves to hold the pieces of edible material and only said portion of the shell of each of said vacuum drums communicates with said vacuum source.

* * * * *